Dec. 18, 1951   S. STIBER   2,578,758
RECEIVER ATTACHMENT FOR INSTANTANEOUS DIRECTION FINDERS
Filed Sept. 8, 1949
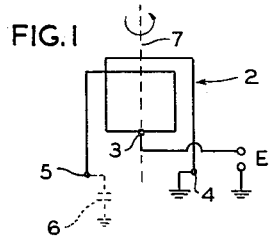
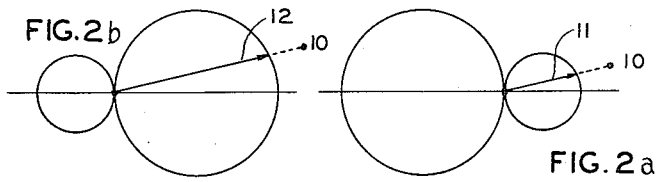
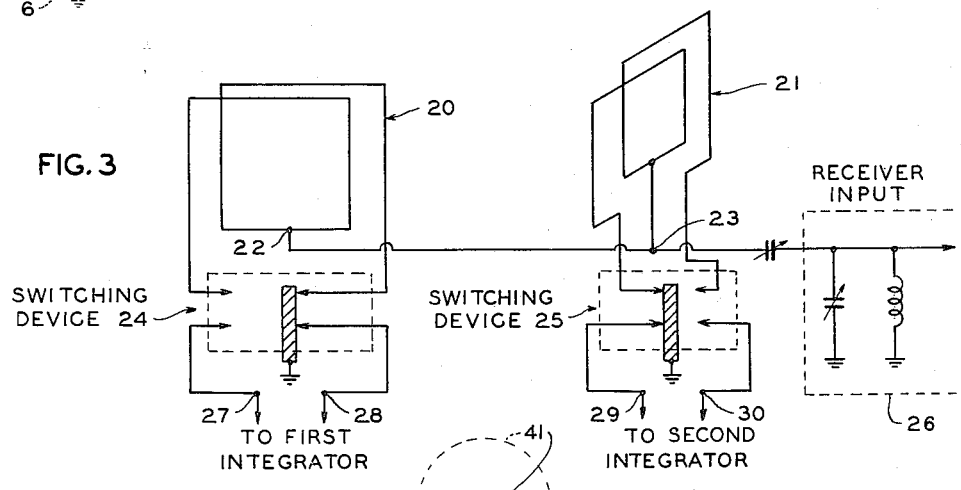
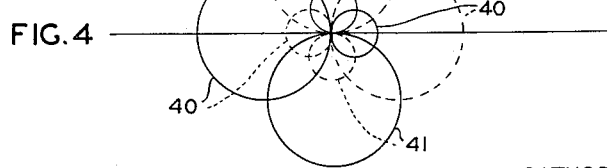
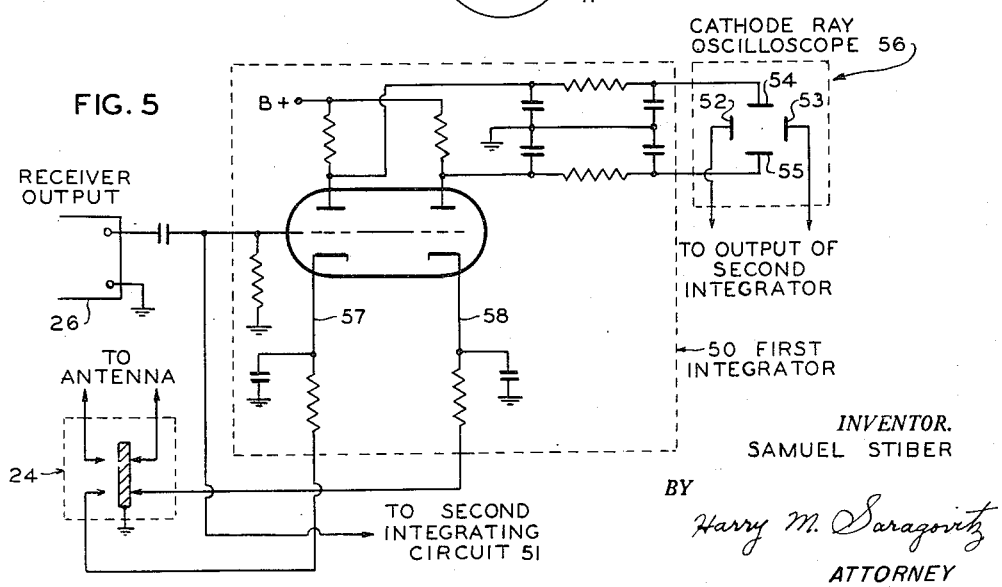
INVENTOR.
SAMUEL STIBER
BY
Harry M. Saragovitz
ATTORNEY Patented Dec. 18, 1951

2,578,758

UNITED STATES PATENT OFFICE 2,578,758

RECEIVER ATTACHMENT FOR INSTANTANEOUS DIRECTION FINDERS

Samuel Stiber, Asbury Park, N. J., assignor to the United States of America as represented by the Secretary of the Army Application September 8, 1949, Serial No. 114,632

5 Claims. (Cl. 343—120)

(Granted under the act of March 3, 1883, as amended April 30, 1928; 370 O. G. 757)

The invention described herein may be manufactured and used by or for the Government for governmental purposes, without the payment of any royalty thereon.

This invention relates to direction finding apparatus by means of radio waves and more particularly to directional radio antennas.

In the conventional loop direction finder, a receiver is excited by a loop antenna that is rotated until a zero or minimum response of the receiver is produced. The transmitter direction is then broadside to the loop at the null or edgewise to the loop at the maximum; and the appropriate direction (azimuth) can be indicated by a pointer attached to the loop. It is customary to use the minimum rather than the maximum output of a loop when finding an azimuth. This permits a sharply defined indication and greater accuracy. Unless the general direction of the transmitter is known, such a direction finder cannot determine whether a transmitter lies forward or to the rear of the direction finder. This 180° ambiguity is caused by the two null positions of the loop, both of which indicate the same line of direction. There is no indication as to which of the two is correct.

Combination of the conventional loop antenna with other directional or non-directional antennas have been used to determine the true location of the signal source. The "sense" antenna is usually a vertical whip or monopole placed at the vertical axis of the loop. It is omnidirectional in azimuth. Both the circular response pattern of the sense antenna and the figure 8 pattern of the loop are symmetrical; but when properly combined the two antennas produce a lopsided or unidirectional pattern. These combinations usually require the mixing of signals from two or more antennas with the consequent complexity of circuits involved. The accuracy of these systems also depends to a large degree on the careful adjustment of the circuits, the proper proportioning of the signal strengths of the various antennas, the proper phasing of the signals, and the need for balanced receivers to separately amplify the output of each antenna.

The necessity for rotating a loop antenna to obtain a bearing can be avoided by employing two fixed loop antennas oriented 90° with respect to each other, with their outputs combined in a goniometer, in the well known manner. The two loop antennas have identical electrical characteristics and have a crossed figure 8 pattern of reception. Here, again, a "sense" antenna associated with each loop is necessary in order to determine the true direction of the signal sources.

It is also well known that a loop antenna unbalanced to ground tends to act as if it were in series with a separate sense antenna and a unidirectional field pattern is therefore obtained.

It is an object of the present invention, therefore, to provide a direction finder utilizing two unbalanced loop antennas crossed at right angles to each other, each switched at a predetermined rate, so that the directional patterns produced by each loop antenna are modulated by this switching rate.

It is a further object of the invention to provide means including a loop antenna system having an unbalanced directional receiving pattern, and associated receiver equipment having integrating and indicating circuits connected thereto for the instantaneous indication of the source of radio frequency signals.

It is a further object of the invention to provide a crossed loop antenna system and associated receiver equipment in which sense is indicated automatically and continuously without the need of a separate sense antenna.

It is a further object of the invention to provide a loop antenna system which conveniently permits the simultaneous tuning of the antenna systems thereby greatly increasing its overall sensitivity.

For a better understanding of the invention, together with other and further objects thereof, reference is had to the following description, taken in connection with the accompanying drawings, in which:

Fig. 1 is a diagrammatic view of a single unbalanced loop antenna.

Figs. 2a and 2b show the field pattern produced by an unbalanced loop antenna when either of the two terminals are grounded.

Fig. 3 is a diagrammatic view of two unbalanced loop antennas crossed at right angles to each other.

Fig. 4 shows the field pattern produced by an antenna system as shown in Fig. 3.

Fig. 5 shows the integrating circuit connecting the output of the receiver to the cathode ray oscilloscope.

In the diagrammatic view of Fig. 1 the output, E, of the loop antenna 2 is taken off its midpoint 3. One end, 4, is connected directly to ground and the other end 5 is left floating, that is, it is effectively connected to ground thru the stray capacitive effects, as shown by capacitor 6, due to the inherent structure of the antenna. The field pattern of such an antenna when rotated about vertical axis 7 is shown in Figs. 2a and 2b wherein 11 represents the voltage induced in the antenna from a transmitter located at a point 10 in space. It should be noted that due to the unbalance of the antenna when one end is grounded, the maximum induced voltage when the loop antenna is rotated will be unequal, depending upon whether the grounded or ungrounded loop antenna edge faces the transmitter. Rotating the antenna we get the usual figure 8 pattern with two nulls when the loop is broadside to the transmitter. Grounding point 5 and floating point 4 will reverse this pattern as represented by line 12 in Fig. 2b. With this arrangement physical rotation of the loop is still necessary in order to establish a null position.

Turning now to Fig. 3 there is shown an arrangement in which two unbalanced loop antennas 20 and 21 each similar to the antenna shown in Fig. 1, are positioned at right angles to each other in the vertical plane. Reversing the unbalanced loop antennas with respect to the physical centers 22 and 23 at which the output is taken is accomplished by alternately grounding either end of each loop antenna by switches 24 and 25. Switches 24 and 25 are herein shown as mechanical switches, but they may be replaced by electronically controlled switch means well known in the art without departing from the spirit of this invention. In order to distinguish between the outputs induced in each loop antenna the switching rate of the terminals to ground is made different for each antenna loop. For antenna 20 the switch frequency $f1$ is made 100 cycles per second and for antenna 21, the switch frequency $f2$ is made 137 cycles per second, these values having been chosen for illustrative purposes only. It is important that the switching frequencies are not harmonically related but close enough to be passed by the common receiver. The combined outputs of the two antenna loops are connected to the input of the common receiver 26 of appropriate design. The combined signal outputs of the two antennas 20 and 21, modulated at the switching rates $f1$ and $f2$ are then amplified, demodulated and rectified by receiver 26 simultaneously.

No rotation of the crossed loop antennas are necessary since this system provides all the directional information required to determine the direction of transmission of the received radio signal. No separate sense antenna is required since no ambiguity is present in each loop antenna output due to the electrical unbalance provided by the technique of switching. Referring to Fig. 4 we see the combined field pattern of the antenna system of Fig. 3 wherein solid curve 40 represents the field pattern of antenna 20 when the switch 24 is connected to one end of this loop and dotted curve 40 represents the field pattern of antenna 20 with the switch connected to the other end. Similarly solid curve 41 represents the field pattern of antenna 21 when switch 25 is connected to one end of the loop, and dotted curve 41 represents the field pattern of antenna 21 with the switch connected to the other end.

Referring now to Fig. 5 at the output of receiver 26 we have the combined signals from the two antennas. These signals are now applied to two sets of integrators 50 and 51 each operatively synchronized at the original switch frequencies $f1$ and $f2$ thru contacts 27—28 and 29—30. Since each integrating circuit is operatively synchronized with switches 24 and 25 by the making and breaking of the cathode circuits 57 and 58 respectively, integrating circuit 50 will function for signals received from antenna 20 and integrating circuit 51 (not shown), similar to 50, will function for signals received from antenna 21. The integrators serve to produce non-intermittent signal voltages from the intermittent signals applied thereto. It should be noted that the technique of switching at frequencies $f1$ and $f2$ maintains a positive identification of the signals from antennas 20 and 21 in the integrating circuits and still permits the use of common receiver 26 for simultaneous reception of these signals. The output of integrator circuit 50 is applied to the vertical deflecting plates 54—55 of a cathode ray oscilloscope 56 and the output of integrator circuit 51 is applied to the horizontal deflecting plates 52—53. Any suitable indicating device, such as a meter, may be substituted for the oscilloscope.

While I have described above the principles of my present invention in connection with specific apparatus, and the particular modification thereof, it is to be clearly understood that this description is made only by way of example and not as a limitation on the scope of my invention as set forth in the accompanying claims.

What is claimed is:

1. In a radio directive system for locating the source of radio waves, a pair of loop antennas arranged at right angles relative to each other, one end of each of said pair being connected directly to ground, the other end of each of said pair being effectively connected to ground through the stray capacity inherent in said system whereby each of said loop antennas has a dissymmetrical field pattern, first and second switch means, the ends of one of said loops being connected to ground through the first of said switch means at a first predetermined rate, the ends of the other of said loops being connected to ground through the second of said switch means at a second predetermined rate, a receiver having an input circuit and an output circuit, a conductor connecting one end of said input circuit to the midpoint of each of said loop antennas, the other end of said input circuit being connected to ground, first and second integrating circuits connected to the output of said receiver and operatively functioning at said first and second switching rates, and indicating means connected to the outputs of said integrating circuits whereby the location of said source is instantaneously indicated by said indicating means.

2. In a radio directive system for locating the source of radio waves, a pair of dissymmetrical loop antennas lying in crossed planes, a first switching means connected to each end of one of said pairs of antennas for alternately grounding each end at a first predetermined rate, a second switching means connected to each end of the other of said pairs of antennas for alternately grounding each end at a second predetermined rate; a receiver having an input circuit and an output circuit, a conductor connecting one end of said input circuit to the midpoint of each of said loop antennas, the other end of said input circuit being connected to ground, a first integrating circuit operatively synchronized with said first switch means and connected to said output circuit, a second integrating circuit operatively synchronized to said second switch means and connected to said output circuit, and indicating means connected to the outputs of said integrating circuits whereby the energy induced in each of said loop antennas is synchronously applied to said indicating means.

3. In a radio directive system as described in claim 2 wherein said indicating means comprise a cathode ray oscilloscope including two sets of deflecting elements.

4. In a radio directive system for locating the source of radio waves, a pair of dissymmetrical loop antennas lying in crossed planes, a receiver having an input circuit and an output circuit, first and second integrating circuits connected to said output circuit, indicating means connected to the outputs of said first and second integrating circuits, a first means for alternately applying the voltages induced in each half of one of said pairs of antennas to said input circuit at a first predetermined rate, a second means for alternately applying the voltages induced in each half of the other of said pairs of antennas to said input circuit at a second predetermined rate, and means for operatively synchronizing said first and second integrating circuits with said first and second means whereby an instantaneous indication of the direction of said source is obtained.

5. In a radio directive system for locating the source of radio waves, a pair of dissymmetrical loop antennas arranged at right angles with respect to each other, a receiving system including integrating means and indicating means, means for alternately connecting the voltages induced in each half of said loop antennas to said receiving system at different predetermined rates, means for operatively synchronizing said alternating means with said integrating means whereby the instantaneous indication of the direction of said source is indicated on said indicating means.

SAMUEL STIBER.

REFERENCES CITED

The following references are of record in the file of this patent:

UNITED STATES PATENTS

| Number | Name | Date |
|--------|------|------|
| 2,190,038 | Neufeld | Feb. 13, 1940 |
| 2,216,708 | Kolster | Oct. 1, 1940 |
| 2,266,038 | Hinman | Dec. 16, 1941 |